Jan. 24, 1967  C. A. MENDENHALL  3,300,008
ELECTROMAGNETIC CLUTCH
Filed Jan. 29, 1965
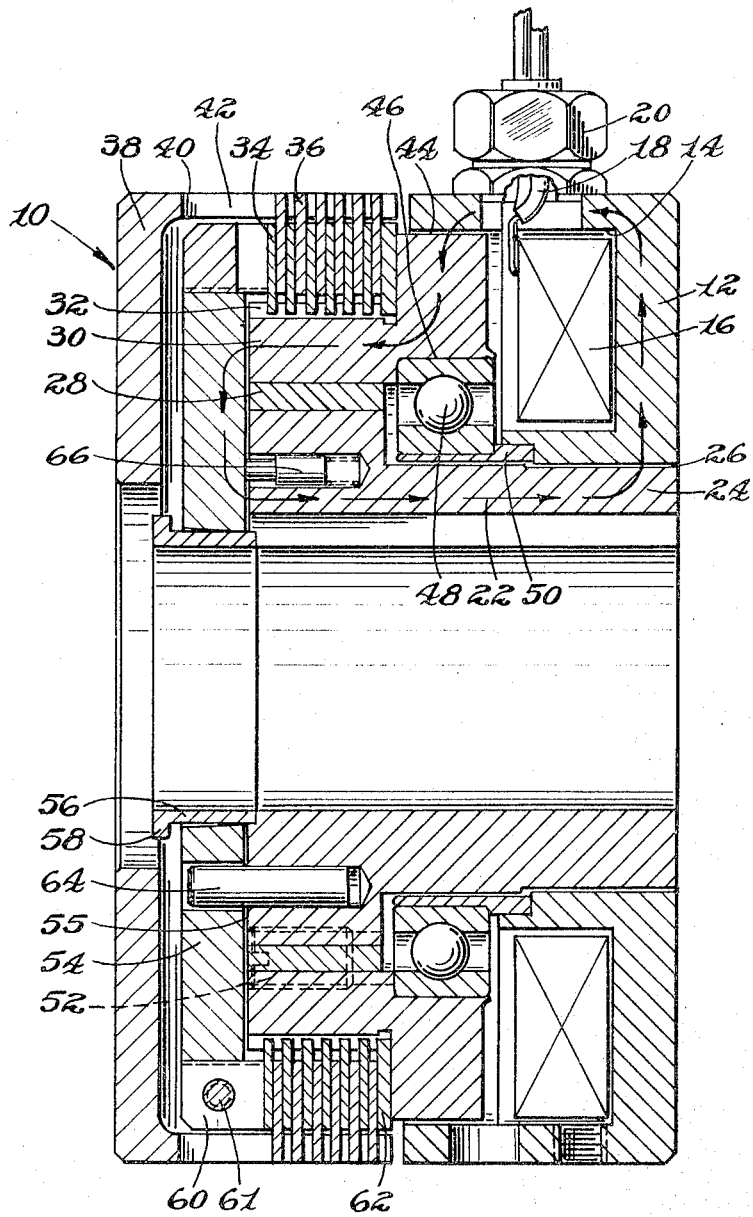
WITNESS:
Esther M. Stockton
INVENTOR.
Charles A. Mendenhall
BY W. S. Thompson
ATTORNEY

3,300,008
ELECTROMAGNETIC CLUTCH
Charles A. Mendenhall, Horseheads, N.Y., assignor to The Bendix Corporation, Elmira, N.Y., a corporation of Delaware
Filed Jan. 29, 1965, Ser. No. 428,911
8 Claims. (Cl. 192—84)

The present invention relates to an electromagnetic clutch and more particularly, an electromagnetic clutch of the stationary-coil, multiple-disc type of improved design, producing greater reliability, life and capacity for a given volume than known prior art clutches of this class.

It is an objective of the present invention to provide an electromagnetic clutch having a stationary magnet or coil containing body spaced axially from a multiple disc clutch (disc pack) and so arranged such that rotating parts do not rub non-rotating parts with clutch disc wear.

It is a further objective of the present invention to provide a clutch design wherein the coil is located in an optimum environment remote from clutch heat and having good heat sink protection so that greater coil effectiveness (more ampere turns) can be obtained.

It is a still further object of the present invention to provide an electromagnetic clutch having clutch-bearing-coil location so arranged to accommodate a maximum diameter shaft co-axial of the clutch assembly.

Other objects and advantages of the present invention will become apparent with reference to the accompanying description and drawing.

Referring to the drawing, there is shown in schematic form, a cross-sectional view of my electromagnetic clutch design, generally designated by numeral 10. The clutch includes a fixed or stationary magnet body 12 adapted to be secured to fixed mounting structure (not shown) and fabricated of magnetic flux conducting-material such as iron or steel. Magnet body 12 is formed to provide an annular recess or cavity 14 within which is mounted an electromagnetic coil 16 which may be secured in the cavity by resin or other conventional means. Coil 16 has leads 18 extending radially upwardly as viewed in the drawings where they may be connected to a controlled power source or control circuit (not shown) through the connector 20.

The clutch of the present invention is reversible with respect to input and output sides and thus, clutch structure which in one installation would be an input member, in another installation would be an output member. Accordingly, rotating input and output members in the following description are referred to generically as first and second power transmitting members.

My clutch further includes a first power transmitting member 22 which consists of three integral subparts. First, a generally-cylindrical member 24 defining the radially-inner confine of the clutch and which extends axially so that one end is concentric with the magnet body 12, but having a small but definite radial air gap 26 therebetween. Cylindrical member 24 is fabricated of magnetic flux conducting material. An annular ring 28 of non-conducting magnetic flux material such as brass or the like forms a second subpart of the first power transmitting member 22 and is integrally secured to cylindrical member 24. A third and radially outermost annular member 30 is comprised of magnetic flux conducting material and is integrally secured to the ring 28 so that the first power transmitting member is a laminated member having radially inner and outer magnetic flux conducting portions and an intermediate non-flux conducting section. It will be apparent that magnetic flux is inhibited from travelling radially through the first power transmitting member, but may travel in a general axial direction through both the inner cylindrical member 22 and the outer annular member 30.

The first power transmitting member 22 has axially-extending splines 32 formed along one portion of its outer surface and on which are slidably mounted a first plurality of annular friction discs 34. It will be readily understood that the spline connection fixes the first plurality of discs to the first power transmitting member rotationally while permitting relative axial movement. A second plurality of friction discs 36 are alternately disposed between adjacent discs 34 to comprise a friction clutch disc pack. Discs 36 are connected to a second power transmitting member 38 which has an axially-extending portion 40 having slots 42 providing an axially-slidable, but rotationally-fixed connection with the discs 36.

The annular member 30 extends axially to the right as viewed in the drawing of the friction disc pack, forming a reaction plate on one side of the disc stack and providing a second radial air gap 44 with the magnet body 12. The inner radial edge of annular ring 30 has a groove 46 forming a seat for the outer race of bearing 48 which in turn is supported at its inner race by sleeve 50 which is brazed or otherwise secured to magnet body 12.

The three laminated sections of the first power transmitting member may be integrally secured in various conventional ways such as, for example, drilling and tapping an oversize screw hole that overlaps all three sections and inserting a screw 52 as illustrated in the lower half of the drawing. While the screw, if steel, would permit a small flux leakage from radially inner to radially outer segments, a certain limited amount of flux leakage can be tolerated, depending on coil and current strength and the flux gap spacing. Moreover, the non-conducting ring need not necessarily be annularly continuous, but may be comprised of a series of annularly-arranged segments interspersed with thin ribs interconnecting the radially inner and outer members just so long as adequate and operative flux strength is maintained in an axial direction.

An annular armature plate 54 is fabricated from magnetic flux conducting material and is arranged a small spaced distance from one side face of the first power transmitting member 22, providing an axial air gap 55 and extends radially to overlap all three laminated segments. An abutment collar 56 is secured to one end of the first power transmitting member and provides a sliding mounting surface for the armature plate. At the leftmost end of collar 56 there is formed a radially-extending circular lip 58 which provides an abutment stop for the armature plate. The abutment collar is preferably made from non-flux conducting material such as bronze or the like.

At the radial outer-most edge of the armature plate 54, there is provided a threaded annular clearance adjustment ring 60 which may be moved axially with respect to the armature plate and fixed in place by screw 61. Adjustment ring 60 bears against the friction disc pack and is adjustable to establish the desired clearance between disc segments and to accommodate for disc wear during use.

The adjustment ring 60 and annular spacer 62 at the opposed side of the disc pack are preferably fabricated of non-magnetic material in installations where the discs 34 and 36 are flux-conducting metal elements to block flux leakage through the disc pack.

A locating pin 64 is secured to the first power transmitting member 22 and extends axially through an enlarged hole in armature plate 54 to key the armature plate and first power transmitting member together while permitting relative axial movement therebetween. Spring loaded plunger 66 is set in a drilled passage in the first power transmitting member and abuts armature plate 54 and apply a retraction force tending to bias the armature plate against circular lip 58.

The clutch, as illustrated in the drawing, is shown in the engaged position whereby the first and second power transmitting members are frictionally coupled. In this condition, electrical power is supplied through leads 18 to coil 16 which generates an electromagnetic field following the path illustrated by arrows in the drawing. This flux travels in a loop through the magnet body 12, jumping the radial air gap 44, axially through the outer annular member 30 (thus reaching past the disc pack), jumping the axial air gap 55 to armature plate 54. From thence the flux travels radially inwardly of the armature plate where again jumps the axial air gap 55, passing through cylindrical member 22, the radial air gap 26, back to the magnet body. The magnetic flux exerts a pull across the axial air gap 55, holding the armature plate to the right whereby ring 60 compresses the disc pack for clutch engagement. When the circuit to coil 14 is interrupted, the flux decays, permitting spring loaded plunger 66 to retract the armature plate against lip 58, thus releasing the disc pack and permitting relative rotation between first and second power transmitting members.

It will be observed that one feature of my device is that the rotating armature plate 54 is adjacent another rotating member, the first power transmitting member 22. Thus, as the friction discs wear the point where the armature plate can abut member 22, wear or abrasion between stationary and rotating parts is avoided. The coil location is offset or set axially a spaced distance from the disc pack and thus, minimizes the effect of friction heat permeating the coil, requiring it to be de-rated. The location also permits a large coil and three-sided heat sink protection from the magnet body which permits maximum clutch torque rating for a given size. The bearing member is so located that it does not reduce the space at the radial clutch center to accommodate maximum shaft size.

Although but one embodiment of the invention has been shown and disclosed, it will be apparent that variations may be made to specific details of the preferred embodiment without departing from the scope of the invention as defined in the claims.

I claim:
1. An electromagnetic clutch comprising:
   first and second co-axle rotatable power transmitting members;
   disc clutch means having an annular friction disc pack connected to said first and second power transmitting members to selectively couple and release said power transmitting members;
   said first power transmitting member extending radially inwardly of said clutch means;
   an axially-shiftable annular armature plate disposed on one side of said disc pack, operative to selectively compress and release said disc pack;
   a stationary annular magnet body disposed on another side of said disc pack;
   an annular electromagnetic coil fixedly secured within said magnet body;
   said first power transmitting member having a radially-inner portion, an intermediate portion and a radially-outer portion;
   said magnet body, said armature plate, said radially-inner portion and said radially-outer portion comprised of magnetic flux conducting material;
   said intermediate portion comprised of non-flux conducting material;
   said radially-inner portion defining a first radial air gap with the radially-inner end of said magnet body;
   said radially-outer portion defining a second radial air gap with the radially-outer end of said magnet body;
   said armature plate axially spaced adjacent one end of said first power transmitting member to provide first and second axial air gaps with said radially-inner and outer portions respectively; and
   said coil operative on actuation to establish a flow loop of magnetic flux bypassing said disc clutch means flowing through said magnet body, said first power transmitting member, and said armature plate moving said armature plate axially to actuate said disc pack.

2. An electromagnetic clutch as claimed in claim 1 including:
   spring means operative to bias said armature plate in a clutch disengaged axial direction and said coil when energized, operative to exert a pull on said armature plate in a clutch engaged axial direction.

3. An electromagnetic clutch as claimed in claim 1 including:
   connecting means interconnecting said first power transmitting member and said armature plate rotationally while permitting limited relative axial movement therebetween.

4. An electromagnetic clutch as claimed in claim 1 including:
   bearing means for rotationally connecting said first power transmitting means to said stationary annular magnet body; and
   said bearing means spaced axially intermediate to said coil and said friction disc pack.

5. An electromagnetic clutch comprising:
   first and second power transmitting members;
   clutch means associated with at least one of said power transmitting members for selectively interconnecting said power transmitting members;
   one of said power transmitting members having an alternating sandwich type construction of flux and non-flux conducting materials disposed radially inwardly of said clutch means;
   said clutch means including an axially movable armature means;
   a non-rotatable coil member at least axially separated from said axially movable armature means by one of said power transmitting members; and
   said power transmitting member having the sandwich type construction operative to conduct substantially all flux generated by said stationary coil only radially inwardly of said clutch means.

6. An electromagnetic clutch as claimed in claim 5 wherein:
   said clutch means includes a plurality of clutch disc members.

7. An electromagnetic clutch as claimed in claim 5 wherein:
   a body member partially encloses said coil;
   said body member and at least one of said power transmitting members defines at least one radial air gap; and
   bearing means supporting one of said power transmitting members disposed radially inwardly of at least one of said air gaps.

8. An electromagnetic clutch as claimed in claim 7 wherein:
   said armature means is operative to compress said disc clutch members; and
   said armature member and one of said power transmitting members are connected for rotation together.

References Cited by the Examiner

UNITED STATES PATENTS

| 2,729,318 | 1/1956 | Harter | 192—84 |
| 2,957,562 | 10/1960 | Rudisch | 192—84 |
| 2,966,975 | 1/1961 | Wiedmann et al. | 192—84 |

DAVID J. WILLIAMOWSKY, *Primary Examiner.*

A. T. McKEON, *Assistant Examiner.*